US008036966B2

(12) United States Patent
Brittan et al.

(10) Patent No.: US 8,036,966 B2
(45) Date of Patent: Oct. 11, 2011

(54) SYSTEM AND METHOD FOR FACILITATING FOREIGN CURRENCY MANAGEMENT

(75) Inventors: Philip Brittan, Chappaqua, NY (US); Alan Dweck, Turramurra Nth. (AU); Sergey Tarsis, Brooklyn, NY (US); Jigar Pancholi, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 1107 days.

(21) Appl. No.: 11/697,940

(22) Filed: Apr. 9, 2007

(65) Prior Publication Data

US 2008/0027850 A1    Jan. 31, 2008

Related U.S. Application Data

(60) Provisional application No. 60/790,347, filed on Apr. 7, 2006.

(51) Int. Cl.
*G06Q 40/00* (2006.01)
(52) U.S. Cl. ............................................. 705/35; 705/30
(58) Field of Classification Search ................ 705/10–44
See application file for complete search history.

(56) References Cited

U.S. PATENT DOCUMENTS

| | | | |
|---|---|---|---|
| 5,787,402 A * | 7/1998 | Potter et al. .................... | 705/37 |
| 5,884,274 A | 3/1999 | Walker et al. | |
| 5,890,140 A | 3/1999 | Clark et al. | |
| 6,421,653 B1 * | 7/2002 | May .............................. | 705/36 R |
| 6,892,184 B1 * | 5/2005 | Komem et al. ............. | 705/26.41 |
| 6,938,010 B1 * | 8/2005 | Everson et al. ............. | 705/36 R |
| 6,985,878 B1 | 1/2006 | Yamazaki et al. | |
| 7,024,383 B1 | 4/2006 | Mancini et al. | |
| 7,171,386 B1 * | 1/2007 | Raykhman ..................... | 705/37 |
| 7,231,366 B1 * | 6/2007 | Barry ............................. | 705/38 |
| 7,340,430 B2 * | 3/2008 | Mulinder et al. ............... | 705/37 |
| 7,571,136 B2 * | 8/2009 | May ................................ | 705/37 |
| 2001/0056398 A1 | 12/2001 | Scheirer | |
| 2002/0156718 A1 | 10/2002 | Olsen et al. | |
| 2004/0267655 A1 | 12/2004 | Davidowitz et al. | |

OTHER PUBLICATIONS

International Search Report mailed Nov. 13, 2007 in counterpart International Application No. PCT/US07/66234.

* cited by examiner

*Primary Examiner* — Frantzy Poinvil
(74) *Attorney, Agent, or Firm* — Frank J. DeRosa; Frommer Lawrence & Haug LLP (57) ABSTRACT

Systems, methods, and computer program products for facilitating managing foreign currency exposure, such as that with respect to transactions in financial interests involving foreign currency exchange across multiple electronic trading platforms, financial systems, accounting systems or the like. Users may monitor their net foreign exchange ("FX") exposure in different currencies and on different value dates due to trading in foreign exchange, foreign currency-denominated equities, fixed-income securities, commodities, services, goods and other transactions involving foreign currency exchange. Various tools may be provided for monitoring and managing FX exposures across multiple trading platforms through ready access to FX liquidity sources as well as for conducting financial transactions involving foreign currency exchange, such as FX hedging or other types of transactions.

54 Claims, 6 Drawing Sheets

Fig. 1

| | | | FX Currency Balances Blotter | | | | |
|---|---|---|---|---|---|---|---|
| TradeFX | Settings | Balance | Download | Options | | | |
| Scope | Source | CtrPty | Account | Order | | | |
| Dealcode | All | All | All | All | | | |
| | USD | | Value | CHF | EUR | JPY | HKD |
| TOTAL | Realized | Unrealized | | 1.2492 | 1.2426 | 109.55 | 7.7697 |
| 5.29 | 13.00 | -7.71 | 08/10/05 | -10.00 | | 32.30 | |
| -3.81 | | -3.81 | 08/11/05 | 3.00 | -5.00 | | |
| -5.58 | -7.00 | 1.42 | 09/01/05 | | | | 11.00 |
| -6.78 | | -6.78 | 10/05/05 | | | -742.33 | |
| -10.88 | 6.00 | -16.88 | TOTAL | -7.00 | -5.00 | -710.03 | 11.00 |
| | VAR: | 0.678 | CL: | 99.0% | Horizon: | 1 day | |

SYSTEM AND METHOD FOR FACILITATING FOREIGN CURRENCY MANAGEMENT

CROSS-REFERENCE TO RELATED APPLICATIONS

This application claims the benefit of U.S. Provisional Application No. 60/790,347, filed Apr. 7, 2006, which is hereby incorporated by reference in its entirety. This application is related to commonly owned U.S. application Ser. No. 10/643,663, filed Aug. 19, 2003 and titled "COMPLEMENTARY TRADING OF INTERESTS," and U.S. application Ser. No. 10/963,462, filed Oct. 12, 2004 and titled "RELATIVE PRICING FOR PROPOSALS FOR TRADING OF FINANCIAL INSTRUMENTS," both of which are hereby incorporated by reference herein in their entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This patent document contains material relating to the trading of financial interests. The trading of some financial interests is regulated, as for example by the United States Government, the various State governments, and other governmental agencies within the United States and elsewhere. The disclosure herein is made solely in terms of logical and financial possibility and advantage, without regard to possible statutory, regulatory, or other legal considerations. Nothing herein is or is intended as a statement or representation of any kind that any method or process proposed or discussed herein does or does not comply with any statute, law, regulation, or other legal requirement whatsoever, in any jurisdiction.

FIELD OF THE INVENTION

The present invention relates generally to the trading of financial interests and, more specifically, to systems and methods for monitoring and managing foreign currency exposure, and for facilitating trading of financial interests involving a foreign currency exchange.

BACKGROUND OF THE INVENTION

In the modern global economy, trading in financial interests, commodities, equities and services frequently occurs across diverse geographic markets and involves transactions requiring foreign currency exchange. In these types of transactions, traders are exposed to the additional risk of loss due to unfavorable, and often sudden, fluctuations in foreign currency exchange rates. To mitigate these foreign exchange exposures, traders in securities and other financial interests frequently engage in various forms of foreign exchange hedging or other complementary foreign exchange transactions in, for example, options, futures, other financial interests, services, goods, and/or other assets in order to set off possible currency exchange risks.

These trading strategies typically require traders to monitor multiple transactions having foreign exchange elements thereto across multiple disparate electronic trading platforms. An apparent lack of integration between such trading platforms, as well as dissimilar user interfaces, diverse trading tools, and different financial notations provided by these electronic trading platforms impose additional burdens on the traders in conducting often complex and time-sensitive financial transitions having various forms of foreign exchange risks associated therewith.

SUMMARY OF THE INVENTION

In accordance with some embodiments of the present invention, systems, methods, and computer program products provide for facilitating monitoring and/or managing foreign currency exposure that may arise from transactions, and/or transacting in foreign currency relating to such transactions. Such foreign currency exposure may be associated with one or more electronic platforms, such as trading platforms, purchasing systems, accounting systems, or other financial systems, or the like. Managing such foreign currency exposure may include executing transactions with respect to such foreign currency exposure.

Some embodiments of the present invention provide for simultaneously or concurrently monitoring foreign exchange exposures arising from transactions conducted, monitored, managed, etc., on a plurality of electronic platforms, such as platforms directed to trading, purchasing, and/or accounting for transactions involving, financial instruments, goods, services, and other asset classes. Various implementations of the present invention allow users (e.g., individuals, trading floors, banks, companies, divisions, groups, etc.) to monitor their foreign exchange ("FX") exposure in different currencies and on different value dates due to trading or transactions in foreign exchanges, foreign currency-denominated equities, fixed-income securities, commodities, services, goods, and/or other assets, and/or due to any other transaction involving a foreign currency exchange aspect or component and/or to engage in FX transactions related thereto. Such exposure may be netted, aggregated, etc., on various bases for users. Any such or other transaction that involves, implicates, or in any way affects foreign currency exposure, whether increasing or decreasing such exposure, is referred to herein as an FX related transaction.

Some embodiments of the present invention may also provide various tools for managing FX exposure across one or more financial systems (e.g., trading platforms/systems, accounting systems, etc.) through ready access to FX liquidity sources as well as tools for conducting financial transactions involving foreign currency exchange, such as FX hedging or other types of transactions.

An embodiment of the present invention comprises an FX blotter system operative to collect information about FX related transactions conducted via one or more electronic trading platforms, purchasing systems, accounting systems, or other financial systems or the like. The collected information may be stored in a data store or database, e.g., an FX blotter database, of the FX blotter system and presented to the user via an interactive FX blotter interface, which in some implementations may be personalized. The FX blotter system comprises an interface that presents to the user information which may include, but is not limited to, information on status of the transaction, outstanding FX balances in one or more currencies, counterparties to the transaction, or the like. The information presented to the user in the FX blotter interface may include itemized and aggregated FX balances in the underlying transactions in various currencies thereof and on different value dates, as well as various analytical measures of the FX exposure associated with the underlying financial transactions.

In some embodiments, the displayed foreign currency balances reflect a user specified hedge policy. For instance, at least one of the displayed foreign currency balances may reflect a user specified hedge ratio being applied to an actual foreign currency balance. Different hedge ratios may be specified for different foreign currency balances, such as those corresponding to different currency types and/or different value dates. Alternatively or additionally, at least one of the displayed foreign currency balances (e.g., EUR) may reflect at least a portion of at least one other foreign currency balance (e.g., Polish Zlotych, PLN and/or Denmark Kroner, etc.), which may or may not also be displayed via the user interface.

Some embodiments of the present invention may provide for real-time monitoring of various parameters associated with the given FX related transaction, such as fluctuations of the foreign exchange rates for the currencies of the given FX transaction, accrued FX balances, trading activity on the originating trading platforms, or the like, and presenting the updated FX information to the user through the FX blotter interface. In some embodiments, the FX blotter system periodically (at regular or irregular intervals) queries one or more trading platforms (e.g., which may be identified by a user) to retrieve updated FX transaction information. Alternatively or additionally, one or more trading platforms may push updated information to the FX blotter system in real-time upon executing an FX related transaction and/or at regular or other irregular intervals, which intervals may also provide for real-time monitoring. Various embodiments of the FX blotter system may also provide for manual entry and/or adjustment of balances and other information corresponding to FX related transactions, thus also allowing, for example, for monitoring of FX related transactions that may arise from transactions other than those executed by one or more electronic platforms (e.g., trading, accounting, etc.) communicatively coupled with the FX blotter system.

To facilitate collection of FX transaction information from disparate financial systems (e.g., electronic trading platforms, financial and accounting systems, and any other sources of FX related transaction information), in some embodiments of the present invention the FX blotter system may expose one or more application program interfaces ("APIs") utilizing a financial information exchange ("FIX") protocol or other financial information protocols (e.g., SWIFT), or any other type of protocol (e.g., XML-based) known to those of skill in the art. Illustrative protocols that may be used in various embodiments of the present invention for exchanging financial data between electronic trading platforms and the FX blotter system include, but are not limited to, eXtensible Business Reporting Language ("XBRL"), Financial products Markup Language ("FpML"), Interactive Financial Exchange ("IFX"), Market Data Definition Language ("MDDL"), etc.

In some embodiments, an FX blotter system may provide via a user interface a plurality of filters that allow users to view total FX exposure according to, for example, underlying financial transaction(s) or another particular line of interest. In one embodiment, a filter may be provided that determines whether the FX blotter interface shows FX exposure for only an individual user or for a group (e.g., a bank or trading floor, which, for example, may be identified by deal code). Such exposure may be netted and/or aggregated, etc. In some embodiments, a filter may be provided to view FX balances for a particular trading platform, or financial or economic system. In some embodiments, a filter may be provided that displays FX exposures relating only to a particular counterparty. As will be understood by those skilled in the art, many other filtering schemes may be applied to the FX transaction data collected by the FX blotter system and displayed to a user in various embodiments of the present invention.

In various embodiments, an FX blotter interface may provide a plurality of tools facilitating monitoring and trading of various FX exposures. For example, if a user selects (e.g., clicks on) any FX balance number in the FX blotter interface, a pop-up menu may be presented listing one or more trading tools. In some embodiments, a tool may be provided that allows the user to trade away that balance, or a portion thereof, on an FX liquidity platform. In some embodiments, various tools may be provided that allow a user to roll an FX balance forward via an FX swap, fund it via a money-market instrument, or view an audit trail of how that balance was constructed from all accruals and draw-downs. Various other types of monitoring and trading tools known to those of skill in the art may be provided through the FX blotter interface.

In various embodiments, an FX blotter interface provides tools for a user to establish rules for automatically, viz, without user invocation or intervention, invoking one or more trades or other transactions with respect to FX balances upon satisfaction of one or more user-defined conditions relating to foreign currency exposure. Such conditions may relate to, for example, amount of foreign currency exposure in one or more currencies, source of foreign currency exposure, relative foreign currency exposure between or among one or more currency types, date, time, etc.

In accordance with some embodiments, the FX blotter system may provide a user initiated trade of all or part of a given FX balance, and in connection therewith, generate an FX trade ticket with the currency, amount, value date, and direction fields filled. The FX blotter system may provide for user modification of one or more fields of the FX trade ticket before sending the FX trade data to selected counterparties (e.g., trading systems). Using the FX trade ticket, the FX blotter system may also provide for users to receive a streaming FX rate from a single counterparty, and/or for users to send a request for quote ("RFQ") to one or more counterparties, confirm a trade with a single selected counterparty, enter a manual trade report or the like via the FX trade ticket. Once a given FX trade is completed, the resulting balance is automatically stored in the FX blotter database, and reported back through an API to the trading platforms that originated those orders, and updated on the FX blotter interface, According to some embodiments of the present invention, an FX blotter system keeps track of the composition of each FX balance, which may be an aggregated balance, according to source(s), order number(s), and account(s) and/or other identifying parameters. Based on such information relating to an FX trade completed with respect to an FX balance, the FX blotter system draws down a balance and allocates the trade across all orders/accounts that make up the given balance. In some embodiments, the FX blotter system provides for allocation of FX trades against orders on a first in first out ("FIFO") basis. In some embodiments, FX trades may be allocated across all orders proportionately, based on the percent of the balance each order represents. FX trades may also be allocated against all accounts within an order proportionately. Other order allocation schemes known to those of skill in the art may be used in various embodiments of the present invention. Allocations may be based on user selection, rules, etc.

Various embodiments of the present invention may facilitate hedging of foreign exchange exposures by providing a tool for identifying complementary positions to hedge foreign exchange risk. For example, if a trader trades a security that normally trades or settles in a first currency, the trader may also wish to make a complementary trade in another currency. Some embodiments of the FX blotter system provide for determination of a suitable complementary position, e.g., by the trader or the FX blotter system, and execution of a second trade on the suitable complementary position. Some embodiments of the present invention may provide through the FX blotter interface various tools for locating such complementary positions through available FX liquidity sources and for conducting complementary transactions.

It will be understood that various embodiments of the present invention provide for mitigating FX exposures in transactions involving present, future, and contingent interests in stocks, bonds, commercial paper, negotiable interests, debt instruments, commodities, and energy interest involving foreign currency exchange, or any FX related transaction. Some embodiments of the present invention may be implemented, for example, for hedging a user's risk against fluctuations in currency exchange rates during the period of time between entry of an order and actual closing and settlement of an executed trade, or for facilitating direct payment, or for other purposes. Trades in financial interests according to embodiments of the invention may include soft, or negotiable, orders, indications of interest, and/or firm trade proposals. Orders may include market orders, such as offers to buy or sell, or acceptance of previously-proposed trades, such as hitting or lifting of previously-made bids or offers. Orders may be for straight sales, auctions, or other types of transactions.

In various embodiments of the present invention, a system facilitates monitoring of FX exposures in various financial transactions involving foreign exchange, and trading in FX interest associated with the financial transactions. The system may facilitate transactions in other interests and may facilitate trading of currencies between various users of the system, or between users of the system and one or more FX liquidity platforms or trading platforms associated with or outside of the disclosed FX blotter system. In some embodiments, the FX blotter system facilitates trading between currency traders and either the service provider who provides the trading system, each other, or, through suitable communications links, banks or other currency traders who are not functionally, contractually or otherwise affiliated with the FX blotter system implementation according embodiments of the present invention.

In accordance with some embodiments of the present invention, a method for facilitating managing foreign currency exposure comprises receiving from at least one electronic platform information representing foreign currency exposure associated with one or more transactions, and providing a user interface that displays one or more foreign currency balances corresponding to the foreign currency exposure. In some implementations, the foreign currency balances may be displayed according to currency type and value date. The at least one electronic platform may include one or more accounting systems, purchasing systems, treasury management systems, trading systems, other financial systems, or any combination thereof.

The method, according to some embodiments, may further comprise providing via the user interface at least one trading tool allowing a user to selectively invoke a trade with respect to a portion or all of at least one of the displayed foreign currency balances. In this regard, the method may comprise receiving a user request to conduct a trade involving at least one of the foreign currency balances; and conducting the requested trade. The method may further provide for reporting results of the conducted trade to each of the at least one electronic platforms corresponding to the traded at least one foreign currency balances.

In accordance with some embodiments of the present invention, a method for facilitating managing foreign currency exposure comprises receiving information representing foreign currency exposure associated with a plurality of transactions; and providing a user interface that (i) displays for each of a plurality of currency types and value dates a foreign currency balance representing a net foreign currency exposure based on the received foreign currency exposure information, and (ii) allows a user to selectively invoke a transaction with respect to at least a portion of at least one of the displayed foreign currency balances.

In accordance with some embodiments of the present invention, a method for facilitating multi-asset class trading comprises aggregating foreign currency exposure corresponding to a plurality of asset classes, and trading all or part of the aggregated foreign currency exposure. The method may further include allocating a trade of the aggregated foreign currency exposure across sources of the aggregated foreign currency exposure.

In accordance with some embodiments of the present invention, a method for facilitating trading comprises aggregating foreign currency exposure corresponding to a plurality of financial systems, and trading all or part of the aggregated foreign currency exposure. The method may further include allocating a trade of the aggregated foreign currency exposure across sources of the aggregated foreign currency exposure.

In accordance with some embodiments of the present invention, a foreign currency exposure system comprises at least one processor configured to receive from at least one electronic system information representing foreign currency exposure associated with one or more transactions, and a user interface that displays one or more foreign currency balances corresponding to the foreign currency exposure. In some implementations, the at least one processor may be configured to receive information from a plurality of electronic systems that are trading platforms for different assets.

In accordance with some embodiments of the present invention, a system for facilitating foreign currency exposure management comprises a foreign currency aggregation module configures to be communicatively coupled to a plurality of financial systems (e.g., electronic trading platforms, purchasing systems, accounting systems, etc.) to receive data representing foreign currency exposure associated with the financial systems (e.g., trades executed on the electronic trading platforms, purchases, accounts payable/receivable on an accrual or cash basis), and an engine that allows a transaction to be invoked to trade all or part of the aggregated foreign currency exposure.

In various embodiments of the present invention, a computer program product comprises a computer program embodied on at least one computer readable medium, the computer program when executed being operative in performing at least one of the methods recited above.

Some embodiments of the present invention provide systems, methods, and computer program products for implementing an FX blotter system as disclosed herein.

It will be appreciated by those skilled in the art that the foregoing brief description and the following detailed description are exemplary and explanatory of this invention, but are not intended to be restrictive thereof or limiting of the advantages which can be achieved by this invention. Additionally, it is understood that the foregoing summary of the invention is representative of some embodiments of the invention, and is neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of this invention.

BRIEF DESCRIPTION OF DRAWINGS

Aspects, features, and advantages of the invention will be understood and will become more readily apparent when the invention is considered in the light of the following detailed description of illustrative embodiments thereof made in conjunction with the accompanying illustrative drawings, in which like references refer to like or corresponding parts, and wherein.

DETAILED DESCRIPTION

As will be understood in view of the ensuing description, embodiments of the present invention comprise systems, methods and computer program products for facilitating monitoring and/or managing (e.g., which may include trading) foreign currency exposure that may arise from any transaction. Such foreign currency exposure that may be monitored and/or managed may be associated with financial interests traded and/or managed on one or more electronic trading platforms, purchasing systems, accounting systems (e.g., treasury management system), or other financial systems or the like. Embodiments of the present invention allow users to monitor their net foreign exchange ("FX") exposure in different currencies and on different value dates due to any transactions involving foreign currency exchange (hereinafter referred to as FX transactions), such as trading in foreign exchange, foreign currency-denominated equities, fixed income securities, commodities, services, goods, and other assets. As indicated above, any such or other transaction that involves, implicates, or in any way affects foreign currency exposure, whether increasing or decreasing such exposure, is referred to herein as an FX related transaction, and this term may be used herein to refer to one or more transactions. Embodiments of the present also provide various tools for managing FX exposure on one or more financial systems through ready access to FX liquidity sources, as well as tools for conducting financial transactions involving foreign currency exchange, such as FX hedging or other types of transactions.

Figure 1:
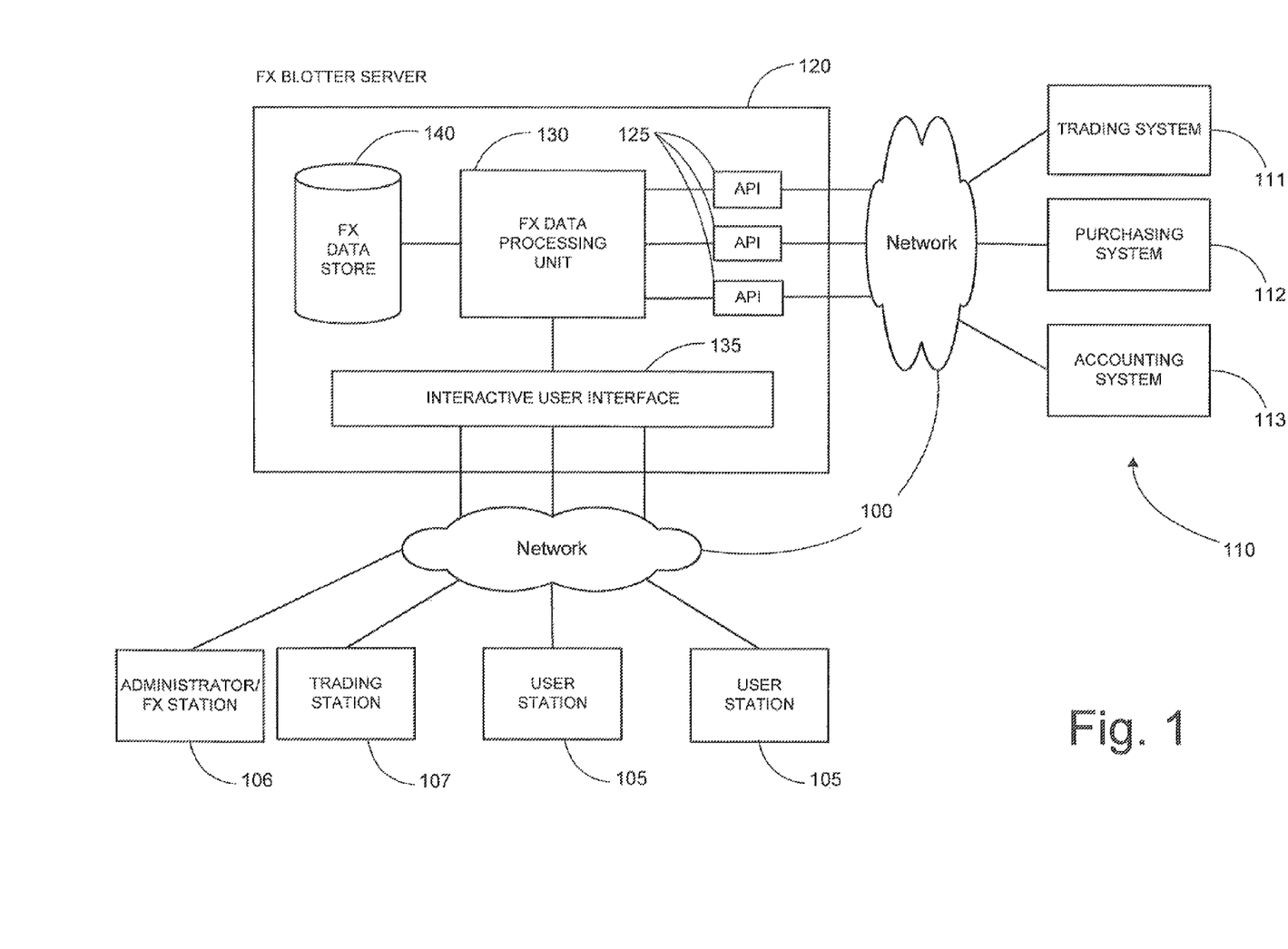
FIG. 1 is a block diagram presenting a system for facilitating foreign exchange transactions according to an embodiment of the present invention.

FIG. 1 is a block diagram schematically depicting an illustrative network environment or system comprising a platform for facilitating monitoring and/or management of foreign currency exposure, in accordance with an embodiment of the present invention. As depicted, in this embodiment, the network environment includes one or more financial systems 110 such as, for example, trading system 111, purchasing system 112, and accounting system 113, communicatively connected to one or more user stations 105 and/or trading station 107 via a communications network 100, such as the Internet or other type of wired or wireless network. Trading stations (e.g., trading station 107 and other trading stations which are not shown) may be used by traders investors or other users to trade, for example, commodities, equities (e.g., foreign-denominated equities), fixed income securities, services, goods, or any other assets or financial instruments or interests, on various trading platforms (e.g., trading system 111 and other trading systems/platforms which are not shown). Each of user stations 105 generally represents a station that, in various embodiments, may be used only with purchasing system 112 (e.g., for purchasing equipment or supplies), or only with accounting systems 113. Alternatively, or additionally, one or more of user stations 105 may be another trading station, similar to trading station 107. In accordance with an embodiment of the present invention, an FX blotter system 120 provides for monitoring and/or managing foreign currency exposure associated with transactions performed on financial systems 110 via trading station 107 and user stations 105. Also in accordance with some embodiments of the present invention, an Administrator/FX station 106 may be used for such monitoring and/or managing, which may include, in some embodiments, Administrator/FX station 106 transacting some or all of the monitored foreign currency exposure through FX blotter system 120 on one or more trading systems (e.g., trading system 111).

Prior to describing components of the illustrative network environment in further detail, it is noted that for ease of reference and convenience, only one trading system 111 is shown. As indicated, however, more than one trading system may be in communication with FX blotter system 120 and/or communicatively coupled to one or more of user stations 105 and trading station 107. Similarly, in various embodiments, a trading station (e.g., trading station 107) may be used with only one trading system 111 or with more than one trading system/platform, which system/platform may be of the same or different types (e.g., foreign equities trading platform, commodities trading platform, etc.). As also indicated, in some embodiments, one or more of user stations 105 may not necessarily be used with a trading platform that provides for trading of financial interests. For instance, one or more user stations 105 may be used exclusively with a financial system 110 that is not involved with trading financial interests (e.g., an accounting system or treasury management system having entries relating to foreign currency exposure, such as postings corresponding to FX related transactions).

Additionally, as will be further understood in view of the ensuing description, FX blotter system 120 provides a user interface (e.g., a graphical user interface, GUI) that displays the foreign currency exposure associated with financial systems 110 and may also provide tools for filtering the foreign currency exposure information as well as tools for invoking transactions with respect to the foreign currency exposure. Those skilled in the art will understand that access to the FX blotter user interface as a whole or with respect to particular features (e.g., tools) thereof may be provisioned or restricted according to user identity, status/authority, or according to other criteria. For instance, a user (e.g., at user station 105) not having access to trading platforms (e.g., access only to accounting systems 113) may not have access to the FX blotter user interface, whereas a trader (e.g., at trader station 107) may only be able to view FX exposure related to transactions originated by him/her, whereas a trading floor administrator may only view FX balances arising from traders (e.g., on an individual or collective basis) on the floor, whereas a foreign exchange manager (e.g., at administrator/FX station 106) may view all FX balances monitored by the FX blotter (e.g., which may arise from disparate platforms, including, in some embodiments, platforms not accessible to traders, such as accounting systems) and also invoke and manage transactions with respect to the displayed foreign currency exposure (e.g., roll-over, fund, hedge, etc.). In some embodiments, only administrative level users may access the FX blotter. In various embodiments, administrative level users specializing in different asset classes may access the FX blotter, and the FX blotter system may be configured such that such administrative level users may only effect trades on trading systems with respect to asset classes in their area of specialization (e.g., foreign equities trading, foreign currency exchange, commodities, etc.).

In view of the present description, it will also be understood that in various alternative implementations, different combinations of one or more financial systems 110 may be configured to provide foreign currency exposure information to an FX blotter system subscribed to or otherwise associated with an entity (e.g., corporation, bank, hedge fund, etc.) such that the entity uses the FX blotter system for monitoring and/or managing that foreign currency exposure. Accordingly, for some entities FX blotter system 120 may receive foreign currency exposure information from only one type of financial system 110 (e.g., an accounting system) or only from a plurality of financial systems 110 of the same type (e.g., commodity trading systems), whereas for other entities FX blotter system may receive foreign currency exposure information from a plurality of financial systems 110 or platforms of different types (e.g., accounting system, equity trading system, commodity trading system, etc.).

Individual components of the illustrative network environment depicted in FIG. 1 according to some embodiments of the present invention will now be described in greater detail.

Each of stations 105, 106, and 107 may be a general-purpose personal computer comprising a processor, transient and persistent storage devices, an input/output subsystem, and a bus to provide a communications path between components comprising the general-purpose personal computer. An example of such a computer is a 3.5 GHz Pentium 4 personal computer with 512 MB of RAM, 40 GB of hard drive storage space, and an Ethernet interface to a network. Other illustrative client devices according to alternative implementations of the present invention include, but are not limited to, workstations, hand held devices, set top terminals, mobile handsets, etc. Stations 105, 106, and 107 typically run software applications (such as a web browser) that provide for exchange of financial information with financial systems 110 using, for example, financial information exchange (FIX) protocol or the like. Trading station 107 may also include programming allowing users to submit communications concerning trades in financial interests, e.g., to post orders to trade financial interests, receive communications from the trading platforms 111, etc.

Trading systems (e.g., one or more trading systems schematically represented by trading system 111) may support trading in financial interests involving foreign currency exchange (i.e., the platforms support trading in financial interests that may involve, implicate, give rise to, or affect foreign currency exposure). For instance, trading system 111 may comprise one or more computer systems configured to facilitate trading in financial instruments including, but not limited to, present, future, and contingent interests in stocks, bonds, foreign exchange, commercial paper, negotiable interests, debt instruments, commodities, and energy interests, or the like. Exemplary trading systems 111 may be operated by a financial services system operator such as Bloomberg L. P. and include Bloomberg Execution Management System ("EMS"), Bloomberg Bond Trader ("BBT"), Bloomberg FX<go>, Bloomberg Tradebook, or the like.

As noted above, in some embodiments, financial systems 110 may comprise a purchasing system and/or accounting system (e.g., a treasury management system) that may, for example, reflect and/or facilitate transactions in goods, services, or interests involving foreign currency exchange. For purposes of illustration of an accounting system providing FX exposure, a US corporation may contract to purchase a quantity of goods from a Japanese company (perhaps to be settled upon delivery at a future date), thus giving rise to an exposure in Yen for payment of the goods, As will be further understood below, upon entry of this transaction into the company's accounting system, the corresponding Yen exposure will be communicated to FX blotter system 120 (which, for example, may also be communicatively coupled to receive FX related transaction information from other systems associated with the US company), allowing for monitoring and/or management thereof. In accordance with some embodiments, as further described below, FX blotter system 120 may provide trading tools, allowing for instance, for a user to fund or hedge an FX exposure via the blotter.

Financial systems 110 run software applications that provide for exchange of financial information with stations 105, 106, 107 using, for example, financial information exchange (FIX) protocol or the like. Financial systems 110 may include programming enabling reception and processing of communications, orders, etc. from the stations 105, 106, 107. Financial systems 110 may further include associated databases or other non-volatile memory systems for storing user, order, trading information, etc., as may be appropriate or required depending on the type of financial system (e.g., accounting, purchasing, type of trading systems). For example, communications concerning a trade in a financial instrument, such as an order to buy or sell a particular security may be transmitted from trading station 107 and correspondingly received and processed by trading system 111.

In accordance with an embodiment of the present invention, an FX blotter system 120 is provided that, depending on the implementation, allows one or more of users at stations 105, 106, 107 to monitor net foreign exchange ("FX") exposure due to trading on trading platforms (e.g., represented by trading system 11) in foreign exchanges, foreign currency-denominated equities, fixed-income securities, commodities, services, goods or the like, as well as due to any other FX related transactions such as those reflected on purchasing system 112 and accounting system 113. FX blotter system 120 may provide various tools for managing FX exposures across financial systems 110 (e.g., including across one or more trading systems, represented by trading system 111), as well as tools for conducting financial transactions involving foreign currency exchange, such as FX hedging or other types of transactions in FX interests. FX blotter system 120 may be operated by a financial services system operator, such as Bloomberg L. P., in conjunction with one or more aforementioned trading platforms provided by this operator. Alternatively, the FX blotter system 120 may be operated by a third-party operator.

In some embodiments, FX blotter system 120 may comprise a plurality of application program interfaces (APIs) 125 for communication with financial systems 110 and exchange of the FX transaction data. APIs 125 may use a financial information exchange ("FIX") protocol or any other type of protocol (e.g., XML-based) that may be used to communicate the FX transaction data. Illustrative protocols that may be used in various embodiments for exchange of financial data between financial systems 110 and the FX blotter system 120 include, but are not limited to, eXtensible Business Reporting Language ("XBRL"), Financial products Markup Language ("FpML"), Interactive Financial Exchange ("IFX"), Market Data Definition Language (MDDL), etc.

Figure 4:
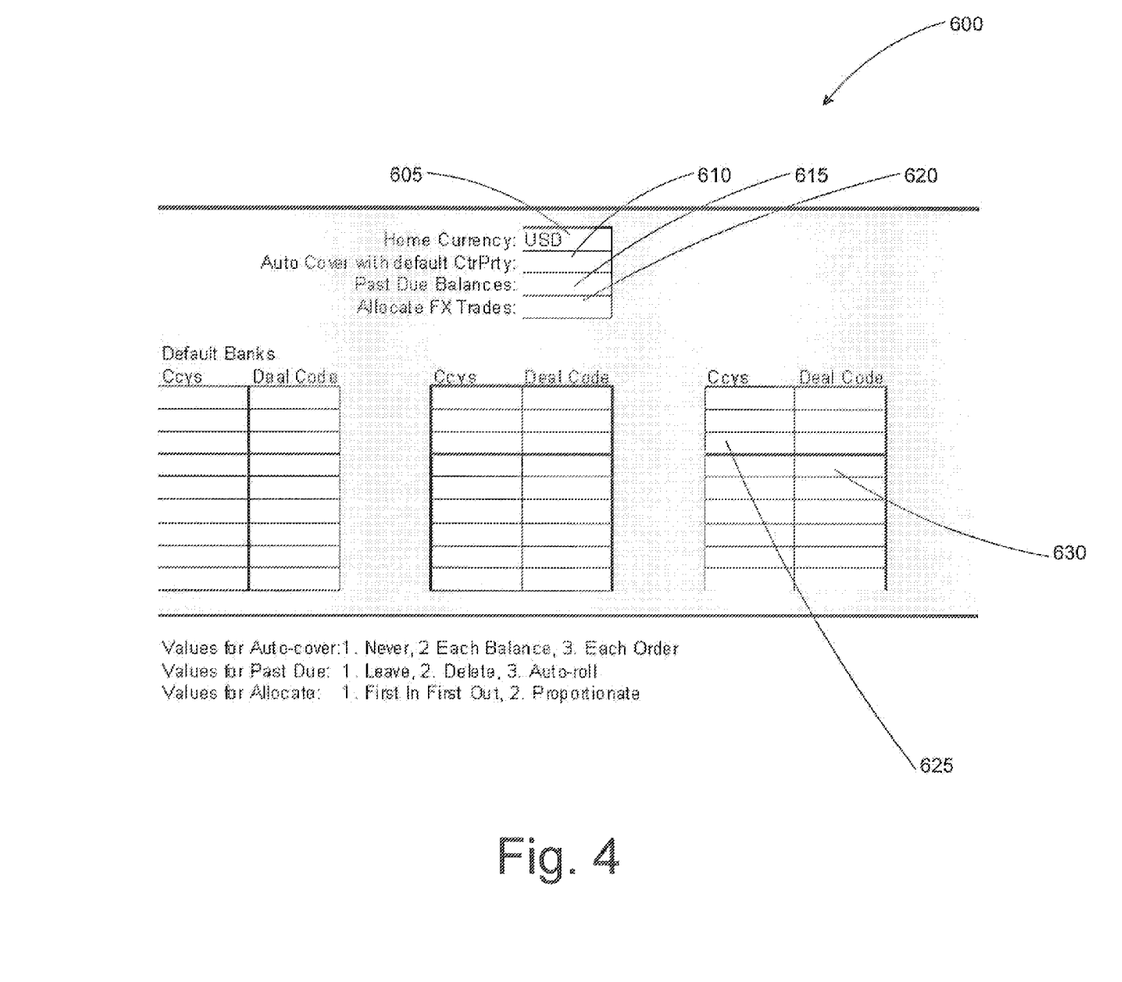

In some embodiments, one or more of financial systems 110 may push FX related transaction information to FX blotter system 120 through APIs 125 in real-time upon executing an FX related transaction and/or at regular or other irregular intervals, which intervals may also provide for real-time monitoring. Alternatively or concurrently, FX blotter system 120 may periodically query one or more platforms/systems 110 to retrieve FX transaction information through APIs 125. In any such implementations, a user of FX blotter system 120 may specify, for example, through a settings interface provided by system 120, (an exemplary embodiment of which is illustrated in FIG. 4 and which will be described in greater detail herein), which platforms/systems 110 are being used for FX related transactions, so that FX transaction data may be collected by FX blotter system 120 from the specified platforms/systems 110.

Through APIs 125, trading financial systems 110 may report to FX blotter system 120 information on the status of the transactions, accrued FX balances, associated currencies, value dates, counterparties, sources, financial system name (e.g., trading platform name), order numbers, accounts or the like. The reported FX transactions may affect two types of FX balances at once: the long and the short sides of the transaction. Through APIs 125, FX blotter system 120 also reports back to the financial systems 110 information on the FX trades conducted by the FX blotter system 120 that cover FX balances submitted by the originating financial systems.

In some embodiments of the present invention, FX transaction data reported by financial systems 110 may be processed by FX data processing unit 130 and stored in the FX data store 140. For example, FX data processing unit 130 may convert FX related transaction data received from disparate financial systems 110 (e.g., including from disparate trading systems) in different data formats into a generic data format for storage and presentation to the users of the FX blotter system 120. In addition, the processing unit 130 may perform various statistical and analytical computations on the received transaction data, such as conversion between different currency units, computation of various measures of risk associated with the FX exposure, or the like. The collected and calculated transaction data may be stored in a portion of the FX data store allocated for the given user account.

In accordance with embodiments of the present invention, FX blotter system 120 further comprises an interactive user interface 135 that allows users to monitor their net FX exposures and conduct various FX transactions using tools provided by FX blotter system 120. In one embodiment, user interface 135 provides a user with a record of outstanding FX balances in different currencies and on different value dates for transactions conducted by a user on financial systems 110 and involving foreign currency exchange (e.g., FX related transactions). All FX balances may be monitored by the system and updated on the user interface 135 in real-time as FX rates move to change the equivalent home currency amounts, and as balances are increased and decreased by activity coming from the financial systems 110. In some embodiments, the FX blotter interface 135 may also provide for manual entry and/or adjustment of balances and other information corresponding to FX related transactions, thus also allowing, for example, for monitoring o FX related transactions that may arise from transactions other than those executed by financial systems communicatively coupled with the FX blotter system.

Figure 2:
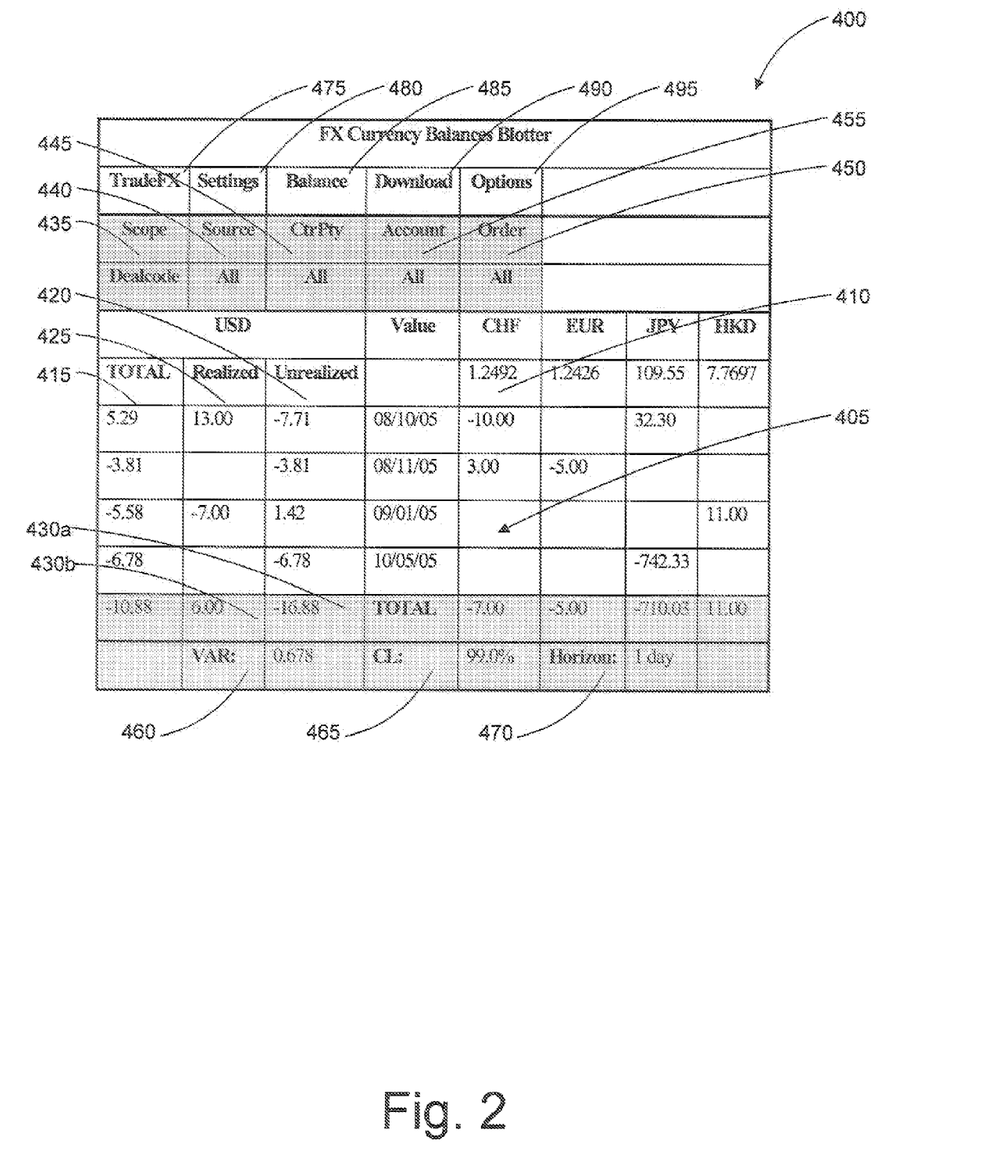
FIGS. 2-4 are exemplary user interface screens useful in implementing various embodiments of the present invention.

An exemplary embodiment of an FX blotter interface is depicted in FIG. 2. The central portion of the FX blotter interface 400 may comprise a balance 405 listing various FX balances, expressed in millions, thousands, or other units (e.g., which may be based on user-specified preferences), which balances represent the net amount of exposure the user has in each currency and each value date. The FX balance information is received from various financial systems (e.g., trading platforms) and updated in real-time to reflect any recent trading activity coming from the originating financial systems.

As depicted in FIG. 2, the given user is short CHF 10 million and long JPY 32.30 million on value date Aug. 10, 2005, and on value date Aug. 11 2005, the user is long CHF 3 million.

In FX blotter interface 400, just beneath each currency header label appears a composite spot rate 410 for the given currency. The spot rates represent the price that a buyer expects to pay for a foreign currency in a home currency. It is also commonly known as benchmark rates, straightforward rates or outright rates. In some embodiments, the composite spot rate may be the Bloomberg composite spot rate. In this example, the spot rate for Swiss Frances (CHF) is 1.2492 US dollars ("USD" denoting US dollar) and for Euros (EUR) is 1.2426 USD, wherein USD is the user-specified home currency. If the user were to change his home currency to another currency, such as to EUR, the spot rates on the FX blotter interface 400 will change automatically to reflect the rates with respect to the new home currency.

Along the left-hand side of the user interface appears columns 415, 425, and 420 comprising fields (or cells) displaying the total value of the positions in the user's home currency, e.g., USD. More specifically, the Unrealized column 420 shows the net amount of the foreign exposures translated into the user's home currency, using the appropriate current composite spot or forward rate, such as Bloomberg composite spot or forward rate. The Realized column 425 shows how much actual home currency has been accrued/spent, and the Total column 415 shows the sum of the Realized and Unrealized columns.

Below the rows associated with value dates appears a row comprising cells containing the totals for each column. For instance, cells 430a and 430b contain the sums of the values for the Unrealized column 420 and the Realized column 425, respectively. Thus, in this example, the user is short net CHF 7 million and long net Hong Kong dollar (HKD) 11 million, and the user's total net foreign currency exposure (displayed in cell 430a) is equivalent to short USD 16.88 million.

In various alternative embodiments, FX blotter interface 400 provides information on the FX balances in different currencies an value dates and, depending on the implementation, may or may not also provide information identifying the underlying transactions that gave rise to these balances (e.g., transactions in foreign exchange, foreign currency-denominated equities, fixed-income securities, commodities, services, goods or the like). Those of skill in the art may recognize that the information collected by the FX blotter system and presented through the user interface and the manner in which it is presented to the user may differ in various embodiments of the present invention. Furthermore, a user may personalize various aspects of the user interface including the manner and amount of presented information.

In accordance with some embodiments of the present invention, a user may configure the user interface to display values according to one or more hedging policies. For instance, the user may enter one or ,pre hedge ratios to be applied by the balances blotter system to one or more of the foreign currency exposures aggregated by the system. Accordingly, at least one of the foreign currency balances displayed via the user interface may reflect a user specified hedge ratio being applied to an actual foreign currency balance. Different hedge ratios may be specified for different foreign currency balances, such as those corresponding to different currency types and/or different value dates (e.g., 0.90 or 90% for EUR exposures up to and including two weeks; 0.75 or 75% for EUR exposures greater than two weeks up to and including one month; 0.50 or 50% for EUR exposures greater than month and up to and including two months; 0.30 or 33% for EUR exposures greater than two months and up to and including three months; 0.15 or 15% for EUR exposures greater than three months). Alternatively or additionally, by way of example, the user may configure a hedging policy such that at least one of the displayed foreign currency balances (e.g., EUR) may reflect at least a portion of at least one other foreign currency balance (e.g., Polish Zlotych, PLN and/or Denmark Kroner, etc.), which may or may not also be displayed via the user interface. That is, for example, where a first currency is highly correlated with one or more other currencies and it may be desirable or advantageous (e.g., due to any of a variety of factors, such as types of transactions available, liquidity, exchange rates, related costs, etc.) to execute transactions with respect to the first currency compared to the one or more other currencies, the user may wish to configure the blotter such that the displayed balance for the first currency reflects a sum of the actual balance for the first currency and at least respective portions (e.g., weighted depending on the respective degree of correlation) of the actual balances for the one or more other currencies. As may be appreciated, the user interface may be configured such that a hedge policy balances blotter display according to the user specified hedge policies may be selectively displayed.

In accordance with the illustrative embodiment, if a user selects (e.g., clicks on) any FX balance number in the balance grid 405, a new user interface may be presented that allows the user choose to perform various transactions on the given balance. For example, the user may trade away that balance on an FX liquidity platform associated with the FX blotter system 120 or on a third-party trading platform, roll it forward via an FX swap, fund it via a money-market instrument, see an audit trail of how that balance was constructed from all accruals and draw-downs, or the like. In the event the requested information is not available in the data store 140, in some embodiments, FX system blotter 120 may retrieve such information through the APIs 125 from the originating financial systems 110. Illustrative balance operations that may be facilitated according to various embodiments of the present invention will be described in greater detail herein with reference to the various trading tools provided by FX blotter interface 400.

According to various embodiments, the user interface may further comprise one or more filters for viewing the collected FX transaction data, allowing users to see their total FX exposures or narrow the view along a particular line of interest. As depicted in FIG. 2, in this illustrative embodiment, the set of filters include Scope, Source, CtrPty, Account, and Order, as displayed above the balance grid 405 in fields 435, 440, 445, 450, 455. In this embodiment, a user may set each filter by clicking on the corresponding field 435, 440, 445, 455 to display a drop-down list of filter options for that filter, and then moving the cursor over the desired filter option (which may then be highlighted) and clicking on the desired filter option, resulting in the filter option being displayed in the field immediately below the corresponding field 435, 440, 445, 450, 455, and the blotter balances being updated to correspond to the specified filter options.

In this embodiment, field 435 provides for setting a Scope filter that determines whether the blotter shows exposure only for the individual user or net exposures for that user's entire deal code. In this implementation, the latter and former Scope filter options are listed as "Dealcode" and "Personal," respectively, with "Dealcode" being displayed in the example shown in FIG. 2. Source filter settable via field 440 is an indicator of from what financial system 110 the exposure came. The Source filter selectable values (e.g., drop-down options) include "All" plus any sources that are currently represented in the FX blotter system 120. CtrPty filter settable via field 445 identifies exposures relating only to a particular counterparty, providing an efficient way for users to monitor their credit exposures. The CtrPty filter selectable values include "All" plus the dealcodes/broker codes of any counterparties currently represented in the FX blotter system 120. Account filter corresponding to field 450 indicates the trading accounts to which the balances can be attributed. The selectable values for this filter include "All" plus any account numbers that are currently represented in the FX blotter system 120. Order filter settable via field 455 allows filtering based on exposures attributed to a particular order number and platform (e.g., EMS, BBT, etc.). The Order filter values that may be selected include "All" plus any order numbers that are currently represented in the FX blotter system 120. In some embodiments, the default value for the Scope filter is "Dealcode," and each default value for Source, CtrPty, Account, and Order filters is "All," "All" indicating that no filtering is done along these dimensions. In various implementations, individual users may set the filter default values according to the user's preferences. The above list of filters is not exhaustive, and various other filters or filtering techniques known to those of skill in the art may be used to view financial data collected by the FX blotter system 120 according to various embodiments of the present invention.

In some embodiments of the present invention, the user interface 135 may also provide one or more statistical and analytical measures of risk associated with one or more FX transactions due to foreign exchange rate fluctuations or other market parameters. For example, the very bottom row of the user interface 400 displays the market Value at Risk (VAR) of the combined foreign exposures within a user-specified Confidence Level (CL) and Horizon period, the corresponding values being displayed, in order, in the cells to the right of fields 460, 465, and 470. The VAR may be expressed in the home currency in the same units (millions/thousand/units) as the balances. In this example, the user interface 400 shows the 1 day VAR at a 99% confidence level to be USD 764,000. This represents the maximum amount of value that this portfolio of balances might lose overnight within a 99% confidence level. The VAR calculation may be based on worst possible movements in the various interest rates and exchange rates involved, and their volatilities and correlations, based on Bloomberg Composite data. The Confidence Level (CL) may be expressed as a percent number and Horizon may be expressed as any number of days, weeks, months, or years. In one embodiment, the default value for CL is 99.0% and for Horizon is 1 day. Those of skill in the art may recognize that various other statistical and analytical measures of the collected financial data may be provided by the FX blotter system of the present invention.

The user interface may further provide a plurality of tools that facilitate monitoring and conducting FX transactions, in accordance with various embodiments of the present invention. As depicted in FIG. 2, illustrative user interface 400 provides several user selectable tool options, including Trade FX in field 475, Settings in field 480, Balance in field 485, Download in field 490 and Options in field 495. When invoked (e.g., by clicking on field 475), the Trade FX tool generates a dealing ticket to request prices on all outstanding balances as a bulk trade/roll (e.g., ALOC pre-allocation trading). Selecting the Settings tool brings a user to a Settings screen, which allows the user to set up various user preferences for viewing financial information collected by the FX blotter system 120. Invoking the Balance tool generates a ticket that lets the user enter an ad-hoc long or short balance. The Download tool provides for downloading all information on the FX blotter interface 400 into Microsoft Excel® or other spreadsheet software. Selecting the Options tool may provide for invoking a Clear All Balances tool that zeroes out all existing balances. Those of skill in the art may recognize that various other tools for viewing and conducting FX transactions may be provided by the FX blotter system of the present invention.

Figure 3:
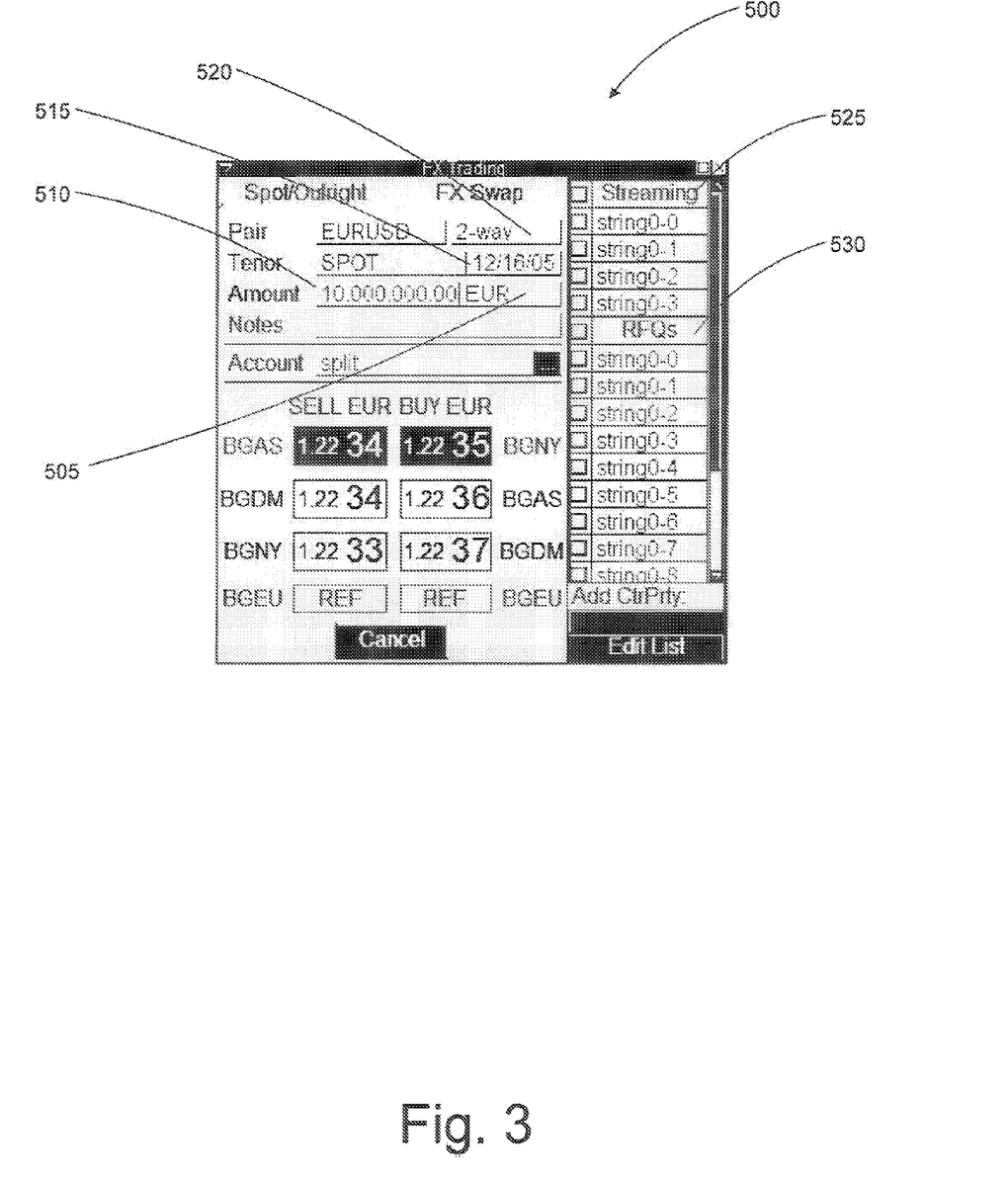

If the user elects to trade away the balances using the Trade FX tool by clicking on field 475, an FX trade ticket is generated by the FX blotter system 120. FIG. 3 illustrates an exemplary trade ticket 500 according to one embodiment of the present invention. As depicted, the trade ticket 500 is generated with the currency field 505, amount field 510, value date field 515, and direction field 520 filled in. The user may modify any portion of the trade ticket 500 before sending it to the selected counterparties. On the trade ticket the user can select to get a Streaming FX rate (indicated by field 525) from a single counterparty, send a request for quote ("RFQ") (indicated by field 530) to one or more counterparties, confirm a trade with a single selected counterparty, or enter a manual trade report. Having modified any aforementioned parameters in the trade ticket 500, the trade may be submitted to FX blotter system 120 to be forwarded to the trading platform (e.g., trading system 111) from which the trade has originated. Alternatively, the balance may be traded on an FX liquidity platform associated with the FX blotter system 120, such as Bloomberg FX<go>, in which case the results of the trade are reported back to the origination platform via APIs 125. Finally, the FX blotter interface 135 is updated with the new balances resulting from the conducted FX trade. The various methods for trading FX are known to those of skill in the art and, therefore, are not discussed in detail herein. One example of FX trading is disclosed in a commonly owned U.S. patent application Ser. No. 10/643,663, filed on Aug. 19, 2003 and titled "COMPLEMENTARY TRADING OF INTERESTS," which is hereby incorporated by reference herein in its entirety.

According to other embodiments of the present invention, the FX blotter interface provides several different ways to trade FX balances. For example, to cover exposure from all value dates in a single Spot ticket, the user may click on a "Total" field at the bottom of the balance grid 405, which will generate a trade ticket for trading the entire amount specified in the total field. In another example, clicking on a date in the "Value" column allows the user to bulk trade/roll all the balances, across all currencies, for the given value date. Yet, in another example, the user can elect to roll a balance forward via an FX Swap. Choosing this option also brings up the FX trade ticket, with an FX Swap instrument pre-selected and all other relevant information filled in. As indicated above, the user can change any of the fields on the generated trade ticket before sending it off to one or more counterparties for a quote. The user may also choose to enter a Confirm or manual Trade Report ticket as well. Any of the above transactions will be automatically reported to the originating financial systems 110, and the resulting balances will be stored in the FX data store 140 and updated on the FX balance interface 135.

According to some embodiments of the present invention, FX blotter system 120 keeps track of how each FX balance was composed by its source, order number, and account. When a given FX trade is completed through the FX blotter system 120 that draws down the associated FX balance, the trade may be allocated across all orders/accounts that make up the balance. The user may choose using the Setting tool (field 480) to allocate FX trades against orders on a first in first out ("FIFO") basis or across all orders proportionately, based on the percent of the balance each order represents. In one embodiment, the default setting is to allocate FX trades against any accounts within an order proportionately. Those of skill in the art may recognize that various other balance allocation schemes may be used in other embodiments of the present invention. According to one embodiment of the present invention, the FX blotter system 120 also allows users to fund balances from the FX blotter interface 135. For example, if the user elects to fund a balance, a Depo/FRA (Deposit/Forward Rate Agreement) ticket appears in which the user can specify the amount to be funded either long or short, the new value date, and interest rate of the funding etc. When the process is completed, the amount of the deposit may be deducted from the balance at the old value date and the amount plus any accrued/paid interest is added to the balance at the new value date. In one embodiment, using the Depo/FRA ticket the user may send a Depo/FRA RFQ to one or more counterparties, access a streaming deposit rate from a chosen liquidity provider, or confirm a trade with a counterparty to execute an actual trade which will be reported in the FX blotter interface 135.

According to various embodiments of the present invention, a user may personalize the FX blotter interface 135 and manner in which FX transactions are monitored and handled by the FX blotter system 120 using the Settings tool (by clicking on field 480). FIG. 4 depicts an exemplary personalization user interface 600. For example, the user may set type of units for displaying FX balances (e.g., millions, thousands, or other units), and specify home currency as an exposure currency (field 605). The user may specify in the field 610 default FX counterparty, and/or currency pair. The user may also specify to route FX cover on any equity deal back to the same broker as equity deal if possible, otherwise to a default FX bank. The user may also specify in field 620 how to allocate FX trades against orders, e.g., FIFO or proportionately, Fields 625 and 630 allow a user to set up default banks (identified by Deal Code) to cover balances with respect to currency pairs (Ccys).

In accordance with various embodiments of the present invention, a user may set auto-cover balances rules, such as all balances as soon as they hit, balances in certain currencies, balances within certain value date ranges, balances above or below a certain size (absolute value), balances from a certain set of sources, balances due to an order as soon as the order is complete. Regarding past due balances, e.g., balances with value dates earlier than current dated, the user can select in the field 615 to leave the past due balances on the blotter, to delete balances automatically, or to auto-roll balances up to today at the specified composite deposit rates.

More specifically, those skilled in the art will understand that according to various embodiments of the present invention, an FX blotter interface 135 provides tools for a user to establish rules for automatically (viz., without user invocation or intervention), invoking one or more trades (e.g., market or limit orders) or other transactions with respect to FX balances upon satisfaction of one or more user-defined conditions relating to foreign currency exposure. Such one or more trades may comprise a series of trades and may comprise one or more asset classes. As indicated, conditions may relate to, for example, amount of foreign currency exposure in one or more currencies, source of foreign currency exposure, relative foreign currency exposure between or among one or more currency types, date, time, etc. Such automatic trading may be implemented, for example, by FX blotter system 120 automatically generating an FX trade ticket and sending the ticket to an electronic FX broking system. Depending on the rule and/or the implementation, an FX balance automatically traded may or may not be displayed through the blotter interface.

For example, a rule may be established to trade away any foreign currency exposure (or foreign currency exposure specified by currency type) amount received by the FX blotter system 102 that is less than a user-specified amount. Accordingly in some implementations of an FX blotter system applying his rule, upon receiving from a financial system FX related transaction information satisfying the condition, the FX blotter system may trade away the FX balance amount corresponding to the FX related transaction information without displaying that balance or otherwise indicating that it was traded away (though it will store and appropriately account for and report information regarding trade). As another illustrative example, a user pre-defined rule may specify trading away the entire balance corresponding to a particular currency upon the balance exceeding a pre-defined limit. Then, upon receiving foreign currency exposure in an amount which if summed with the current balance would equal an amount that exceeds the pre-defined limit, any current non-zero balance already displayed on the blotter for that currency would also be traded away upon satisfaction of the condition.

Those of skill in the art may recognize that various other personalization options may be provided in various embodiments of the present invention.

Figure 5:
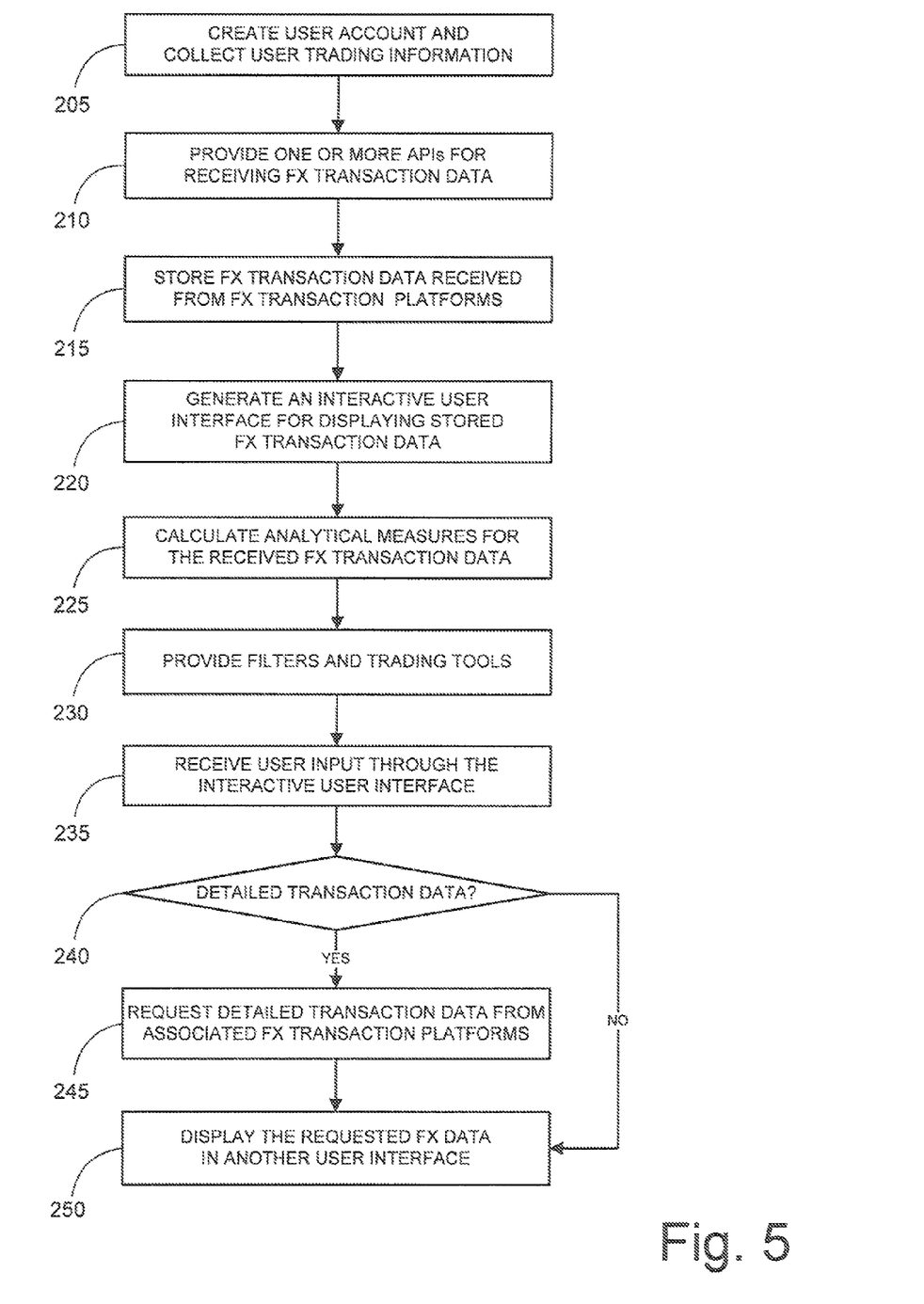
FIG. 5 is a flow diagram presenting a method for monitoring foreign exchange transactions according to an embodiment of the present invention.

FIG. 5 is a flow diagram presenting a method for monitoring foreign exchange transactions using the FX blotter system according to an embodiment of the present invention. Initially, a user subscribes to the services provided by the FX blotter system and creates a user account, step 205. In particular, at this step the user may provide various personal information, set up a user name and a password, specify one or more financial systems to be monitored by the FX blotter system for FX trading activity, as well as specify various personalized parameters described in a greater detail herein with reference to FIG. 4. The provided user information may be stored by the system in a user account data structure maintained by the FX blotter data store.

Having created an account for the given user, the FX blotter system exposes one or more APIs utilizing FX or other type of financial protocol to retrieve FX transaction data from the user-specified financial systems (e.g., including various trading platforms), step 210. The collected FX transaction data may then be stored in the FX data store in the user account data structure, step 215. The system then generates an interactive user interface for presenting the collected FX transaction data to the user, step 220. The generated interface may be personalized based on user preferences stored in the user account. In some embodiments, the FX transaction data includes balances in different currencies and value dates for various trades involving foreign currency exchange.

For the presented FX transaction data, the system calculates various statistical and analytical measures, such as conversion between different currencies, computation of measure of risk associated with the foreign exchange exposure, or the like, step 225. In addition, the system provides a plurality of data filters that allow users to view the total FX exposures or to concentrate along a particular line of interest, step 230. Furthermore, the system provides various tools for managing FX exposures across multiple financial systems (e.g., trading platforms) through ready access to FX liquidity sources as well as tools for conducting financial transaction involving foreign currency exchange, such as FX hedging or other types of transactions.

At step 235, the system receives user input, which may be user activation of one or more data filters or trading tools provided through the interactive user interface. In response the system determines whether the requested action necessitates retrieval of additional FX transaction data from the originating financial system. For example, if the user requests to filter the data by the account, the system does not need to retrieve additional data from the origination financial system and the requested data is displayed to the user, step 250. If however additional information about the transaction is needed, such information is requested from the originating financial system (e.g., a trading system) via the provided FX APIs, step 245, and presented to the user, step 250.

Figure 6:
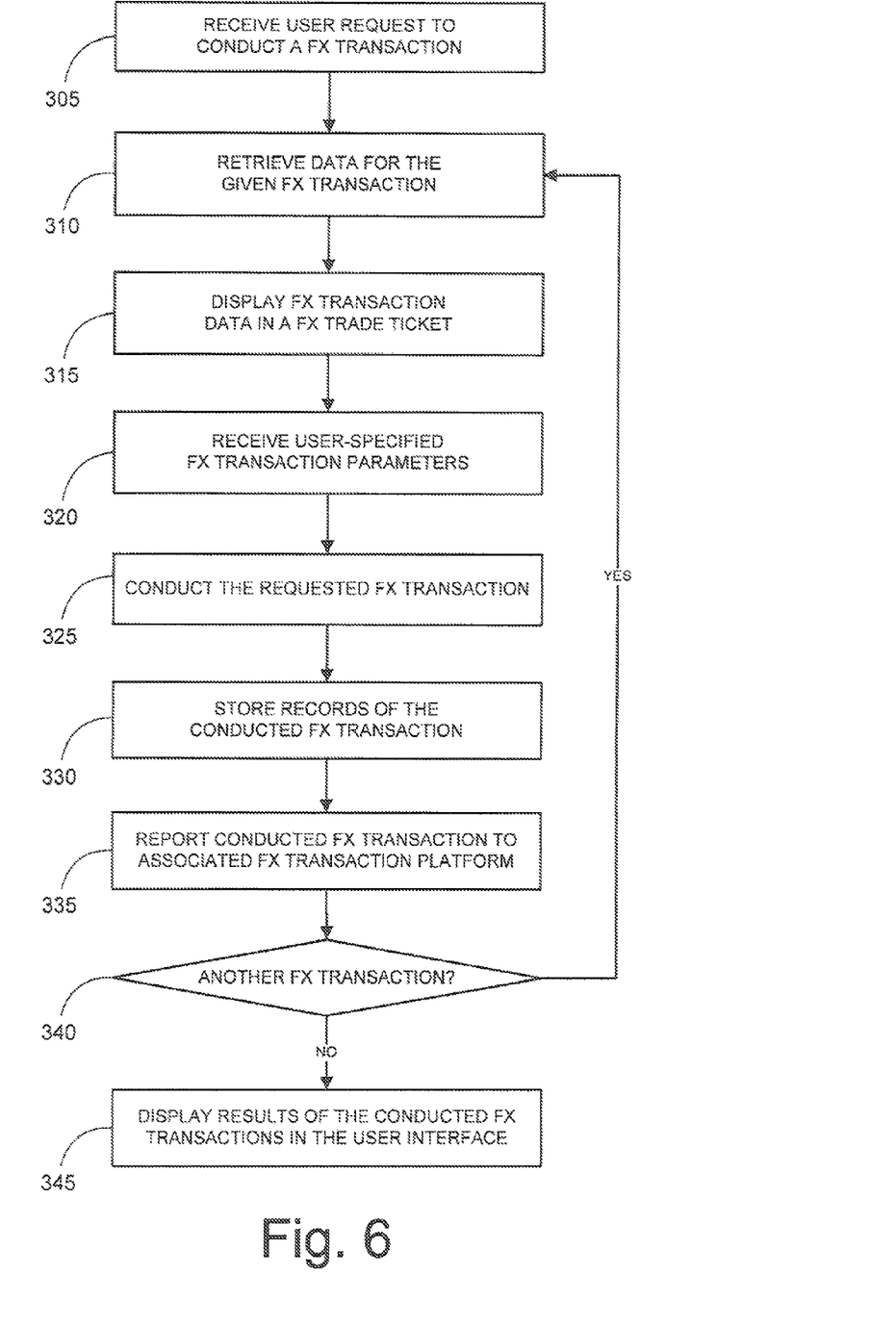
FIG. 6 is a flow diagram presenting a method for facilitating foreign exchange transactions according to an embodiment of the present invention.

FIG. 6 is a flow diagram presenting a method for facilitating foreign exchange transactions according to an embodiment of the present invention. At step 305, the system receives a user request to conduct an FX trade one of the balances presented in user interface, step 305. Such a request may be generated when a user activates an FX trading tool provided through the FX blotter interface. In response, the system retrieves user data from the FX data store and if required from the originating financial system via FIX or other API, step 310. The retrieved FX transaction data, which may include currency, amount, value date, and trade direction, may be displayed in an FX trade ticket. The user may change one or more parameters associated with a given FX trade in the FX trade ticket, step 320.

Having received completed FX trade ticket from the user, the system conducts the requested FX trade on the specified balance using an associated FX liquidity platform or the originating trading platforms, step 325. The records of the conducted transaction are stored in the user account data structure in the FX data store, step 330. If the FX transaction were not conducted through an originating trading platform, the records of the transaction are reported to the originating trading platform (e.g., trading system 111) and/or other financial system, step 335. If the user wishes to conduct another FX transaction, the process flow cycles to step 310, in which the information for another FX transaction data is retrieved and a new FX trade ticket is generated. In the event that the user does not wish to perform another transaction, the FX blotter interface is updated with records of the new balance resulting from the conducted FX transaction, and the process ends.

While the invention has been described and illustrated in considerable detail with reference to certain preferred embodiments herein, other embodiments are possible. Additionally, as such, the foregoing illustrative embodiments, examples, features, advantages, and attendant advantages are not meant to be limiting of the present invention, as the invention may be practiced according to various alternative embodiments, as well as without necessarily providing, for example, one or more of the features, advantages, and attendant advantages that may be provided by the foregoing illustrative embodiments.

Systems and modules described herein may comprise software, firmware, hardware, or any combination(s) of software, firmware, or hardware suitable for the purpose described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

What is claimed is:

1. A method for facilitating managing foreign currency exposure, the method comprising at least one processor performing at least the following steps:
   receiving via one or more application programming interfaces (APIs) information representing foreign currency exposure associated with a plurality of different types of transactions involving foreign currency exchange; and
   providing an interactive user interface that (i) displays on a display device for each of a plurality of currency types and value dates a foreign currency balance representing a net foreign currency exposure based on the received foreign currency exposure information, and (ii) allows a user to selectively invoke a transaction with respect to at least a portion of at least one of the displayed foreign currency balances.

2. The method according to claim 1, wherein the receiving of information comprises receiving foreign currency exposure information associated with a plurality of electronic systems via respective APIs.

3. The method according to claim 2, wherein the plurality of electronic systems includes different electronic trading platforms.

4. The method according to claim 3, wherein at least two of the different electronic trading platforms are operative in trading a respective asset class.

5. The method according to claim 1, wherein the receiving of information comprises receiving foreign currency exposure information associated with at least one electronic system comprising two or more of an accounting system, a purchasing system, a treasury management system, a trading system, or any combination thereof, and wherein the foreign currency exposure information is received via respective APIs.

6. The method according to claim 5, wherein the receiving of information comprises receiving foreign currency exposure information associated with different electronic trading platforms.

7. The method according to claim 5, wherein the receiving of information comprises receiving respective foreign currency exposure information associated with an accounting system and a trading system, 8. The method according to claim 5, wherein the receiving of information comprises receiving respective foreign currency exposure information associated with a purchasing system and a trading system.

9. The method according to claim 1, wherein the plurality of transactions include transactions of different asset classes, the foreign currency balance thereby representing the net foreign currency exposure corresponding to different asset classes.

10. The method according to claim 1, wherein the plurality of transactions comprises transactions conducted on a plurality of electronic systems via a given user station.

11. The method according to claim 1, wherein the plurality of transactions comprises transactions conducted on at least one electronic system via a plurality of user stations.

12. The method according to claim 1, wherein the user interface, in response to the user selecting at least one of the displayed foreign currency balances, displays on the display device at least one possible trading tool available for the user to select for invoking a trade with respect to at least a portion of the selected foreign currency balance.

13. The method according to claim 12, further comprising, in response to the user selecting one of the possible trading tools, the at least one processor conducting the trade with respect to at least a portion of the selected foreign currency balance.

14. The method according to claim 13, further comprising the at least one processor allocating the trade of the at least a portion of the displayed foreign currency balance across sources of the displayed foreign currency balance.

15. The method according to claim 14, wherein the allocation across sources is based on a user selected allocation scheme.

16. The method according to claim 13, wherein the traded foreign currency balance corresponds to foreign currency exposure information associated with at least one electronic system, and the method further comprises the at least one processor reporting results of the conducted trade to each of the at least one electronic system corresponding to the traded foreign currency balance.

17. The method according to claim 1, wherein the user interface in response to the user selecting at least one of the displayed foreign currency balances, displays on the display device a trading ticket for the user to select for invoking a trade with respect to at least a portion of the selected foreign currency balance.

18. The method according to claim 17, wherein the trading ticket is at least partially pre-filled upon display on the display device.

19. The method according to claim 1, further comprising the at least one processor receiving via the user interface a user request to conduct a trade involving at least a portion of at least one of the displayed foreign currency balances and conducting the requested trade.

20. The method according to claim 1, further comprising the at least one processor providing for automatically trading at least a portion of at least one of the displayed foreign currency balances according to a user set rule.

21. The method according to claim 1, further comprising the at least one processor providing for at least one of the displayed foreign currency balances to reflect a user specified hedge policy.

22. The method according to claim 21, wherein at least one of the displayed foreign currency balances reflects a user specified hedge ratio being applied to an actual foreign currency balance.

23. The method according to claim 21, wherein at least one of the displayed foreign currency balances reflects at least a portion of at least one other foreign currency balance based on a correlation between the respective currencies.

24. The method according to claim 1, wherein the user interface provides for manual entry of a foreign currency exposure value, and wherein the at least one computer updates a corresponding displayed foreign currency balance according to the entered foreign currency exposure value.

25. The method of claim 1, comprising for each of a plurality of currency types, the at least one processor aggregating foreign currency exposure corresponding to a plurality of asset classes.

26. The method of claim 1, comprising for each of a plurality of currency types, the at least one processor aggregating foreign currency exposure corresponding to a plurality of electronic systems and wherein the user interface displays according to currency type a foreign currency balance representing the aggregated foreign currency exposure.

27. A system that is operative in facilitating managing foreign currency exposure, the system comprising at least one processor which at least:
receives via one or more application programming interfaces (APIs) information representing foreign currency exposure associated with a plurality of different types of transactions involving foreign currency exchange; and
provides an interactive user interface that (i) displays on a display device for each of a plurality of currency types and value dates a foreign currency balance representing a net foreign currency exposure based on the received foreign currency exposure information, and (ii) allows a user to selectively invoke a transaction with respect to at least a portion of at least one of the displayed foreign currency balances.

28. The system according to claim 27, wherein the at least one processor receives foreign currency exposure information associated with a plurality of electronic systems via respective APIs.

29. The system according to claim 28, wherein the plurality of electronic systems includes different electronic trading platforms.

30. The system according to claim 29, wherein at least two of the different electronic trading platforms are operative in trading a respective asset class.

31. The system according to claim 27, wherein the foreign currency exposure information is associated with at least one electronic system comprising two or more of an accounting system, a purchasing system, a treasury management system, a trading system, or any combination thereof, and wherein the foreign currency exposure information is received via respective APIs.

32. The system according to claim 31, wherein the foreign currency exposure information is associated with different electronic trading platforms.

33. The system according to claim 31, wherein the foreign currency exposure information is associated with an accounting system and a trading system.

34. The system according to claim 31, wherein the foreign currency exposure information is associated with a purchasing system and a trading system.

35. The system according to claim 27, wherein the plurality of transactions include transactions of different asset classes, the foreign currency balance thereby representing the net foreign currency exposure corresponding to different asset classes.

36. The system according to claim 27, wherein the plurality of transactions comprises transactions conducted on a plurality of electronic systems via a given user station.

37. The system according to claim 27, wherein the plurality of transactions comprises transactions conducted on at least one electronic system via a plurality of user stations.

38. The system according to claim 27, wherein the user interface is configured such that in response to the user selecting at least one of the displayed foreign currency balances, the user interface is operative to display on the display device at least one possible trading tool available for the user to select for invoking a trade with respect to at least a portion of the selected foreign currency balance.

39. The system according to claim 38, further comprising a transaction engine that is operative, in response to the user selecting one of the possible trading tools in conducting the trade with respect to at least a portion of the selected foreign currency balance.

40. The system according to claim 39, wherein the transaction engine is operative in allocating the trade of the at least a portion of the displayed foreign currency balance across sources of the displayed foreign currency balance.

41. The system according to claim 40, wherein the allocation across sources is based on a user selected allocation scheme.

42. The system according to claim 39, wherein the traded foreign currency balance corresponds to foreign currency exposure information associated with at least one electronic system, and wherein the transaction engine is operative in reporting results of the conducted trade to each of the at least one electronic system corresponding to the traded foreign currency balance 43. The system to claim 27, wherein the user interface is operative, in response to the user selecting at least one of the displayed foreign currency balances, to display on the display device a trading ticket for the user to select for invoking a trade with respect to at least a portion of the selected foreign currency balance.

44. The system according to claim 43, wherein the trading ticket is at least partially pre-filled upon display to the user.

45. The system according to claim 44, further comprising an engine that is operative in (i) receiving via the user interface a user request to conduct a trade involving at least a portion of at least one of the displayed foreign currency balances, and (ii) conducting the requested trade.

46. The system according to claim 43, further comprising an engine that is operative in automatically trading at least a portion of at least one of the displayed foreign currency balances according to a user set rule.

47. The system according to claim 43, wherein at least one of the displayed foreign currency balances reflects a user specified hedge policy.

48. The system according to claim 47, wherein at least one of the displayed foreign currency balances reflects a user specified hedge ratio being applied to an actual foreign currency balance.

49. The system according to claim 47, wherein at least one of the displayed foreign currency balances reflects at least a portion of at least one other foreign currency balance based on a correlation between the respective currencies.

50. The system according to claim 27, wherein the user interface is operative in providing for manual entry of a foreign currency exposure value, and wherein the at least one processor updates a corresponding displayed foreign currency balance according to the entered foreign currency exposure value.

51. A system that is operative in facilitating managing foreign currency exposure, the system comprising at least one processor configured to at least:

receive via one or more application programming interfaces (APIs) from at least one electronic system information representing foreign currency exposure associated with one or more different types of transactions involving foreign currency exchange; and provide a user interface that is configured to (i) display on a display device one or more foreign currency balances corresponding to the foreign currency exposure, and (ii) allow a user to selectively invoke a transaction with respect to at least a portion of at least one of the displayed foreign currency balances.

52. The system according to claim 51, wherein the at least one processor is configured to receive via respective APIs information from a plurality of electronic systems that comprise trading platforms for a plurality of different asset classes.

53. A system that is operative in facilitating managing foreign currency exposure, the system comprising:

foreign currency aggregation means for receiving data from a plurality of financial systems and providing one or more foreign currency balances, the data representing foreign currency exposure associated with the financial systems;

user interface means for causing a display device to display at least one user selectable foreign currency balance of the one or more foreign currency balances and at least one user selectable transaction related to a selected at least one user selectable foreign currency balance, and for invoking a transaction, selected by a user, to be conducted to trade all or part of the at least one foreign currency balance.

54. A computer program product comprising a computer program embodied on at least one computer readable medium, the computer program when executed by at least one processor being operative to cause the at least one processor to perform a method for facilitating managing foreign currency exposure, the method comprising the at least one processor at least:

receiving via one or more application programming interfaces information representing foreign currency exposure associated with a plurality of different types of transactions involving foreign currency exchange; and providing a user interface that (i) displays on a display device for each of a plurality of currency types and value dates a foreign currency balance representing a net foreign currency exposure based on the received foreign currency exposure information, and (ii) allows a user to selectively invoke a transaction with respect to at least a portion of at least one of the displayed foreign currency balances.

* * * * *